(12) United States Patent
Odryna et al.

(10) Patent No.: US 7,683,896 B2
(45) Date of Patent: Mar. 23, 2010

(54) PIXEL SKEW COMPENSATION APPARATUS AND METHOD

(75) Inventors: Victor Odryna, Acton, MA (US); Barry Mansell, Groton, MA (US); Gail E. Mansell, legal representative, Groton, MA (US); Mark DesMarais, Northboro, MA (US); Robert L. Gilgen, Westfield, MA (US)

(73) Assignee: Avocent Huntsville Corporation, Huntsville, AL (US)

( * ) Notice: Subject to any disclaimer, the term of this patent is extended or adjusted under 35 U.S.C. 154(b) by 788 days.

(21) Appl. No.: 11/303,031

(22) Filed: Dec. 16, 2005

(65) Prior Publication Data

US 2006/0262226 A1 Nov. 23, 2006

Related U.S. Application Data

(60) Provisional application No. 60/636,858, filed on Dec. 20, 2004.

(51) Int. Cl.
*G09G 5/00* (2006.01)

(52) U.S. Cl. .................. 345/204; 345/691; 348/505; 348/582; 348/646; 348/650

(58) Field of Classification Search .............. 345/204, 345/691; 348/646, 505, 542, 582, 639, 650, 348/661, 662; 327/161; 386/13
See application file for complete search history.

(56) References Cited

U.S. PATENT DOCUMENTS

| 5,083,214 A | 1/1992 | Knowles |
| 6,833,875 B1 * | 12/2004 | Yang et al. .................. 348/665 |
| 7,277,104 B2 * | 10/2007 | Dickens et al. .............. 345/691 |

OTHER PUBLICATIONS

International Search Report and Written Opinion mailed Aug. 1, 2008 in PCT Application PCT/US05/46352.
My Appln. No. PI20056038-2009-09-11 MyIPO Substantive Examination Adverse Report.

* cited by examiner

*Primary Examiner*—Abbas I Abdulselam
(74) *Attorney, Agent, or Firm*—Davidson Berquist Jackson & Gowdey LLP (57) ABSTRACT

A two-stage pixel skew compensation circuit for use with digital display monitors. The first stage of the compensation circuit aligns the edges of the pixels received on the color component signal lines of an analog video signal. The second stage of the de-skew compensation circuit realigns the pixels themselves so that no skew exists between the digitized video color components. The digitized video signals drive a digital video monitor.

31 Claims, 11 Drawing Sheets

(Prior Art)

PIXEL SKEW COMPENSATION APPARATUS AND METHOD

CROSS-REFERENCE TO RELATED CO-PENDING APPLICATION

The present application claims priority from co-pending Provisional U.S. Patent application No. 60/636,858, filed Dec. 20, 2004, titled "Pixel Skew Compensation Apparatus and Method," the entire contents of which are incorporated herein by reference.

FIELD OF THE DISCLOSURE

This disclosure relates to pixel skew compensation, and to pixel skew compensation circuits, methods and devices for use with digital display monitors.

BACKGROUND AND SUMMARY OF THE INVENTION

Signal skew is a well known characteristic in high speed communications and video signal transmission. Signal skew also occurs in multiple twisted pair cables that are prevalent today in computer networking. Generally speaking, skew is the mismatch in arrival times of data on different signal lines where the data was originally transmitted at the same time. Skew is caused by different propagation rates through different pairs of cable. This, in turn, is typically caused by different twist rates for the pairs of signal lines. Paired signal wires that have a tighter twist rate cause the signals to propagate over a greater distance. Cables containing twisted pair wires are intentionally designed so that different pairs have different twist rates in order to reduce the cross talk between signal wire pairs.

In digital video monitor applications, analog video signals are transmitted by a computer over twisted pair cables to the video monitor. Usually, video signals transmitted by the computer are analog video signals broken down into the color components of the video signal. Typically, for additive color displays, analog video signals are broken down into red, green and blue color components. The red, green, blue (RGB) video signals each comprise sub-pixel data for a particular pixel. As will be illustrated, each color component of a typical analog video signal can be broken down into a series of consecutive pixel times. A pixel time is simply the period of time which elapses from the beginning of one pixel to the beginning of the next pixel. This value is not to be confused with the number of pixels, which in this context corresponds to the number of active pixels being processed. During transmission from a computer, the RGB video signals are transmitted on different sets of twisted pair signal wires.

In computer applications, the most common twisted pair cables used today are quad UTP (Unshielded Twisted Pair) cables rated as CAT5E, CAT6, etc. When video signals are transmitted on these types of UTP cables, the video sub-pixels arrive out of phase due to cable skew. For long cables, the skew error can be several pixel times. If these sub-pixels were presented on a video monitor, the display quality would be very poor due to their physical misalignment on the video monitor. This physical misalignment is directly attributable to the magnitude of the skew associated with the sub-pixels. The skew associated with the video signals must be removed in order to display the correct composite video signal on a video monitor.

One known method of compensating for signal skew involves the addition of physical delay to the earlier-arriving sub-pixels. Physical delay requires delay elements, such as an LC circuit, or a serpentine delay line. However, the use of physical delay to correct the entire skew has some undesirable characteristics. Typically, physical delay elements designed to compensate for a large amount of skew are physically large and may limit the bandwidth of the signal being passed through them. These physical delay elements may also require a complex control mechanism in order to match the delay to the skew associated with a particular cable installation. As a result of these problems, these physical delay elements are costly.

The present invention contemplates a different approach to compensating for sub-pixel signal skew. The present invention does not rely solely on physical delay to compensate for skew. However, as will be described in detail below, a small amount of physical delay may be used in conjunction with other aspects of the present invention in order to eliminate skew.

In many applications today, UTP cables are used to transmit analog video signals from a computer to a digital display monitor. The digital display monitors convert the analog video signals into digital signals using some form of an analog-to-digital (A/D) converter (or ADC).

One general method of A/D conversion is to sample the incoming analog signal at a very high rate (oversample), and then digitally process the sampled signal to obtain the digital signal information. However, at present computer video rates, this method becomes prohibitively expensive to use for digital displays due to the high speeds inherent in processing these signals. As a result, digital monitors typically sample the analog video stream at the same rate that it was created, that is, synchronous sampling. For synchronous sampling, a sampling clock must be recreated from the information contained in the received video signal. Commonly, a phase-locked loop (PLL) circuit is utilized with the phase of the clock generated by the PLL locked to the received horizontal synchronizing (Hsync) signal. The frequency of the generated clock is generally set to the number of pixel times, not the number of pixels, per scan line.

In these conventional digital display monitors, the A/D converter circuitry ideally samples the incoming analog video signal at the point where the video signal is most stable. These digital monitors use a single clock at the same phase to sample all three of the RGB analog video signals. Typically, this sample time should be around the center of each pixel, rather than near the edge of the pixel, in order to have a good low noise ratio and to achieve a representative display result. There are at least two ways in which these digital monitors adjust the sample time in order to achieve the best result. Early digital monitors included a manual adjustment mechanism. In these monitors, the user would manually adjust the sampling time until the highest quality picture was achieved. Current monitors include signal processing circuitry and features which allow automatic phase adjustment (often with a manual override for users who want to adjust the monitor display themselves). This automatic phase adjustment is implemented using closed looped feedback circuitry and signal processing techniques that are conventionally known and implemented in the art. A common form of one such technique applies different values of phase adjustment to the incoming signal. The quality of the image is checked after each application, and when all phase adjust values have been tested, the center of the largest good quality sample region—that is, the one with the least noise—is selected as the correct phase adjust value. Conventional phase adjustment techniques are described in U.S. Pat. Nos. 6,140,881; 6,597,370, and 6,522,365.

These conventional digital display monitors are usually connected to a computer through a relatively short UTP cable. Consequently, the resulting pixel skew is typically less than one pixel time. Because the pixel skew is short, a satisfactory display is achieved by adjusting the phase of the single sampling clock in the ADC of the digital monitor.

A significant problem arises, however, when the UTP cable separating the video monitor from the video source is lengthy. In these circumstances, the pixel skew can be greater than one pixel period. As a result, no adjustment to the phase of a single sampling clock can eliminate or compensate for all of the skew in the analog video signals received by the video monitor. The present invention compensates for such large scale skew without requiring the use of physical delay elements. Thus, significant advantages are achieved over the conventional methods of skew compensation.

At the highest level, one can think of the present invention as a two step approach to compensating for pixel skew. In the first step, the received video signal pixels are essentially time shifted so that the beginning and ending of each sub-pixel is aligned with the beginning and ending of the other sub-pixels. In other words, at the end of the first step of skew compensation, the various components of the received video signal (for example, red, green and blue) have their pixel edges aligned with one another. In the second stage of skew compensation, the pixels are further time shifted so that, for example, the red pixel corresponding to time period one is aligned with the green and blue sub-pixels corresponding to time period one. At the output of the second stage, digital representations of the received analog video signals are generated without skew.

To put it another way, the present invention is a two step skew compensation apparatus and method wherein the first step is an intrapixel skew compensation step and the second step is an interpixel skew compensation step. As used herein, the term "intrapixel skew" is the separation between the beginning of a pixel time for one color component and the beginning of a pixel time for a second color component, where the two pixel times at least partially overlap each other. The term "interpixel skew" is the separation between the beginning of a pixel time for one color component and the beginning of a pixel time for a second color component, where the two pixel times do not overlap each other. Thus, the distinction between intrapixel skew and interpixel skew lies in the amount of overlap of pixel times for first and second color components.

DETAILED DESCRIPTION OF EXEMPLARY EMBODIMENTS OF THE INVENTION

Figure 1:
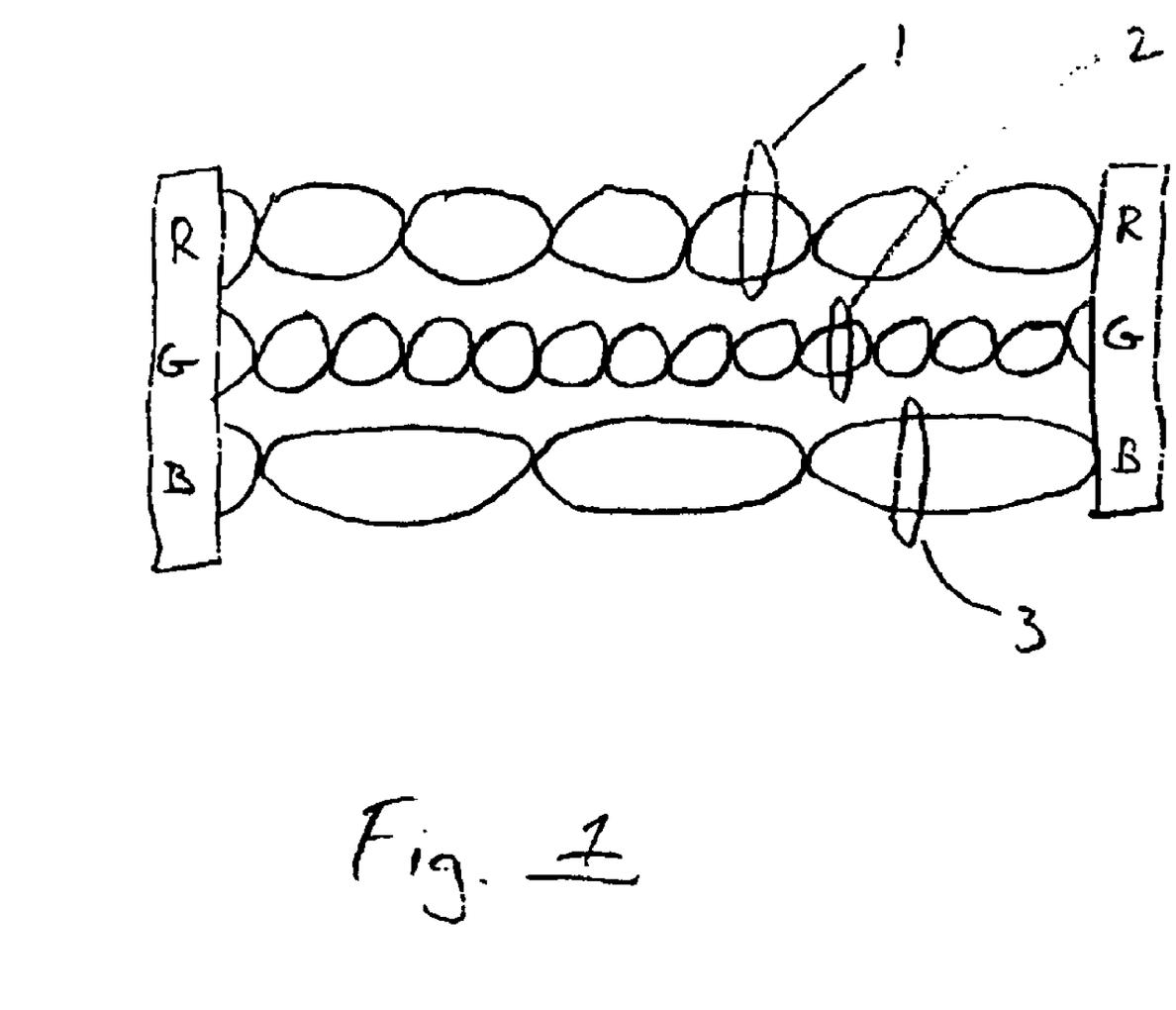
FIG. 1 is a diagram of a typical twisted pair cable showing the different twist rates for signal wire pairs.

Referring now to FIG. 1, cables comprised of twisted pair signal wires are typically constructed so that each pair is twisted at a different rate. Different twist rates are used in order to reduce the amount of cross talk coupled between pairs of signal wires. In the representative cable shown in FIG. 1, twisted pairs 1, 2 and 3 are twisted at different rates. It should be noted that the difference in twist rates between pairs is exaggerated in FIG. 1 for purposes of illustration only. Pair 2 has the highest twist rate followed by pair 1 and pair 3, respectively. For the analog video signals being transmitted over the cable of FIG. 1, the analog video signals are comprised of three color components—red, green and blue. In the example shown, the red color component is transmitted over pair 1. While, the green and blue color components are transmitted over pairs 2 and 3, respectively.

In general, for a twisted pair of wires, the higher the twist rate, the greater the propagation time. So, in the example shown in FIG. 2, pair 3 has the lowest propagation time, and pair 1 has the highest propagation time.

Figure 2:
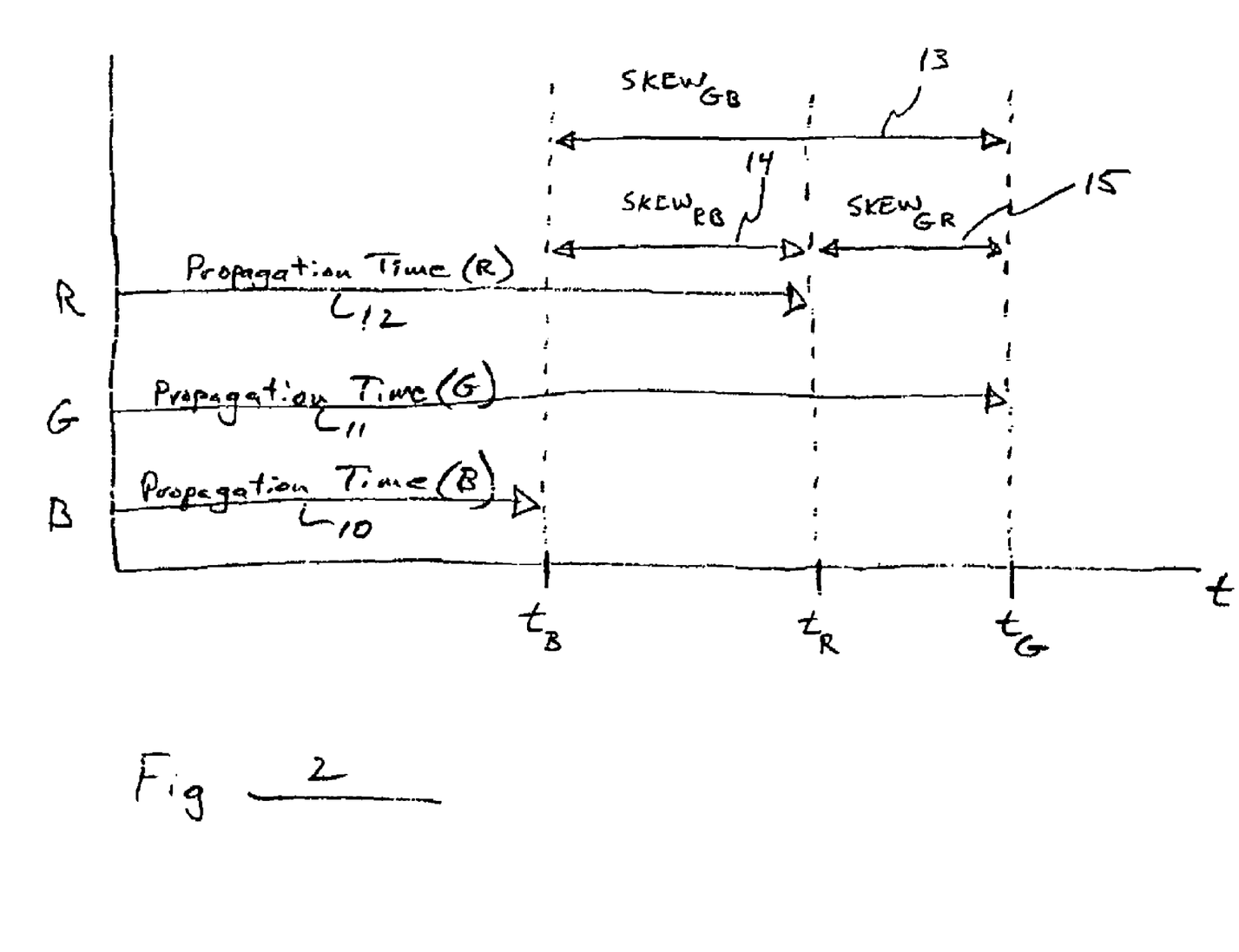
FIG. 2 is a timing diagram showing exemplary relative propagation times and skew for video signal color components through a cable such as the example cable of FIG. 1.

FIG. 2 shows the relative propagation times (not to scale) of the red, green and blue color components through a cable such as that shown in FIG. 1. Because the green color component is transmitted through pair 2 having the highest twist rate, the propagation time (G) 11 for the green color component is the greatest and is indicated as $t_G$. Similarly, because color component blue is transmitted through pair 3 having the lowest twist rate, propagation time (B) 10 for the blue color component is the shortest and is equal to $t_B$. The propagation time (R) 12 for the red color component shown as $t_R$ and is between the propagation time for the green and blue color components 11 and 12.

As FIG. 2 demonstrates, the difference in arrival times of the red, green and blue video signals is a measurable time difference. This difference in propagation times between color components is typically referred to as pixel skew. For example, the difference between the propagation time (G) 11 and propagation time (B) 10 for the green and blue color components is the skew between color components green and blue. This time difference is designated $SKEW_{GB}$ 13 in FIG. 2. The skew between the propagation time for the red and green color components is designated as $SKEW_{GR}$ 15. One can also determine the skew between the propagation time for the red and blue color components which is shown in FIG. 2 as $SKEW_{RB}$ 14.

Figure 3:
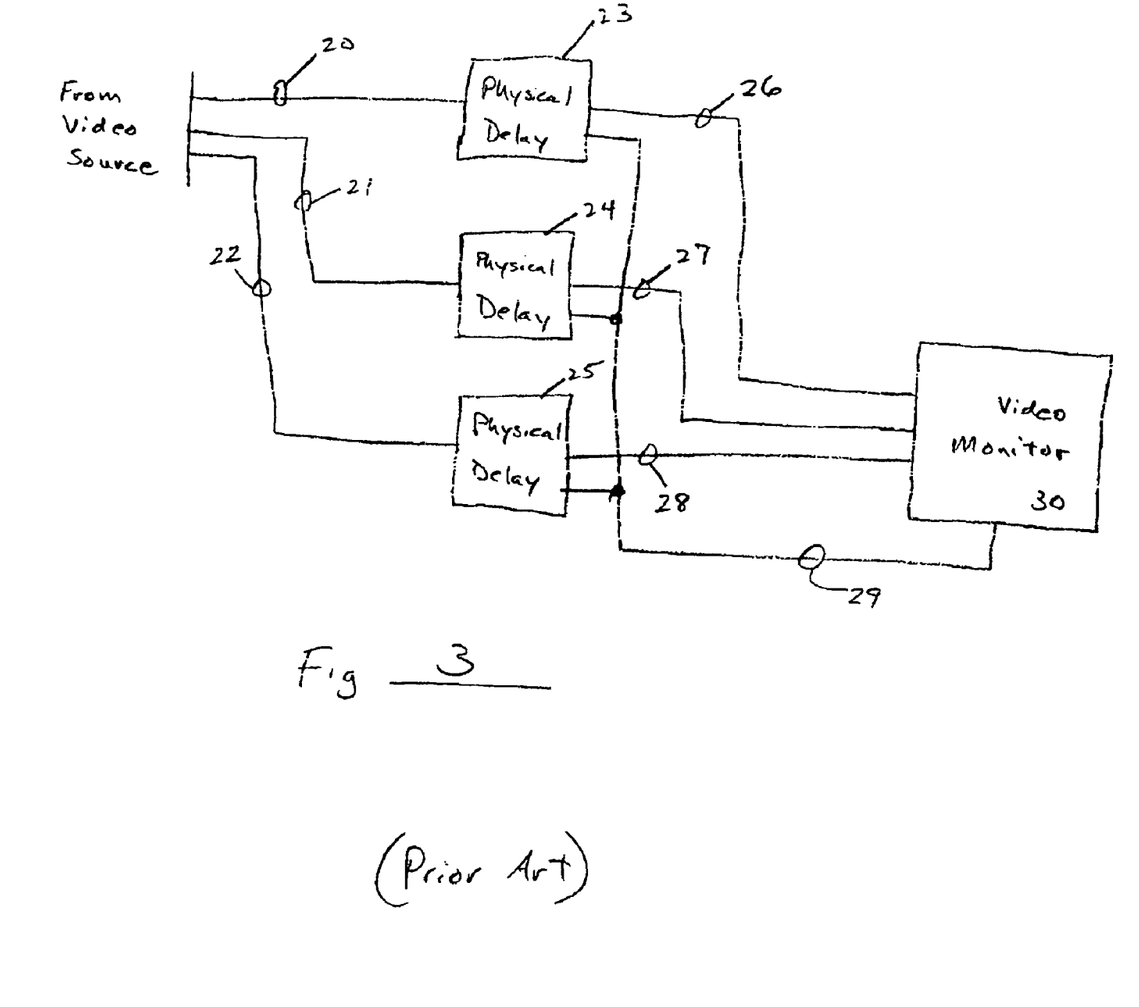
FIG. 3 is a block diagram showing a conventional approach to compensating for signal skew using physical delay.

In most applications where video signals are transmitted over twisted pairs, cable lengths are relatively short. In these situations, the skew between the video signals is less than one pixel period. Consequently, as shown in FIG. 3, physical delay elements 23, 24 and 25 can be added to the receiving end of the cable in order to compensate for the pixel skew. Physical delay elements 23, 24 and 25 are typically included within the digital video monitor 30. However, those delay elements are shown outside the video monitor in FIG. 3 for demonstration purposes. Physical delay elements 23, 24 and 25 are, however, on the video monitor 30 end of the twisted pair cable. In FIG. 3, the red, green and blue color components are shown as signal pairs 20, 21 and 22, respectively. As the red, green and blue video signals arrive at the video monitor end of the cable, they pass through physical delay elements 23, 24 and 25. The amount of delay imposed on the red, green and blue color component signals is variable.

In the earliest digital displays, video monitor 30 had a manual adjustment that permitted the user of the video monitor 30 to adjust the amount of physical delay imposed by delay elements 23, 24 and 25 in order to achieve the best display result. More sophisticated digital display monitors utilize signal processing in order to automatically adjust the amount of physical delay imposed by delay elements 23, 24 and 25. Video monitor 30 controls the amount of physical delay in elements 23, 24 and 25 through control line 29, which may be a plurality of control lines. Because the maximum amount of pixel skew in these applications was less than one pixel time, physical delay elements 23, 24 and 25 each generate an equal amount of delay. The delayed versions of the red, green and blue color components then pass to video monitor 30 through lines 26, 27 and 28, respectively. Video monitor 30 then converts the analog red, green and blue color component video signals into digital signals. The analog-to-digital conversion is a standard A/D conversion process readily known to those in the digital display art. Imposing a physical delay on the red, green and blue color components effectively shifts the time at which those color components are sampled. Because the maximum skew between color components is less than one pixel time, the sample time can be adjusted so that the A/D converter samples each of the three color components at the point where the analog pixel data most closely match the correct pixel data.

Figure 4:
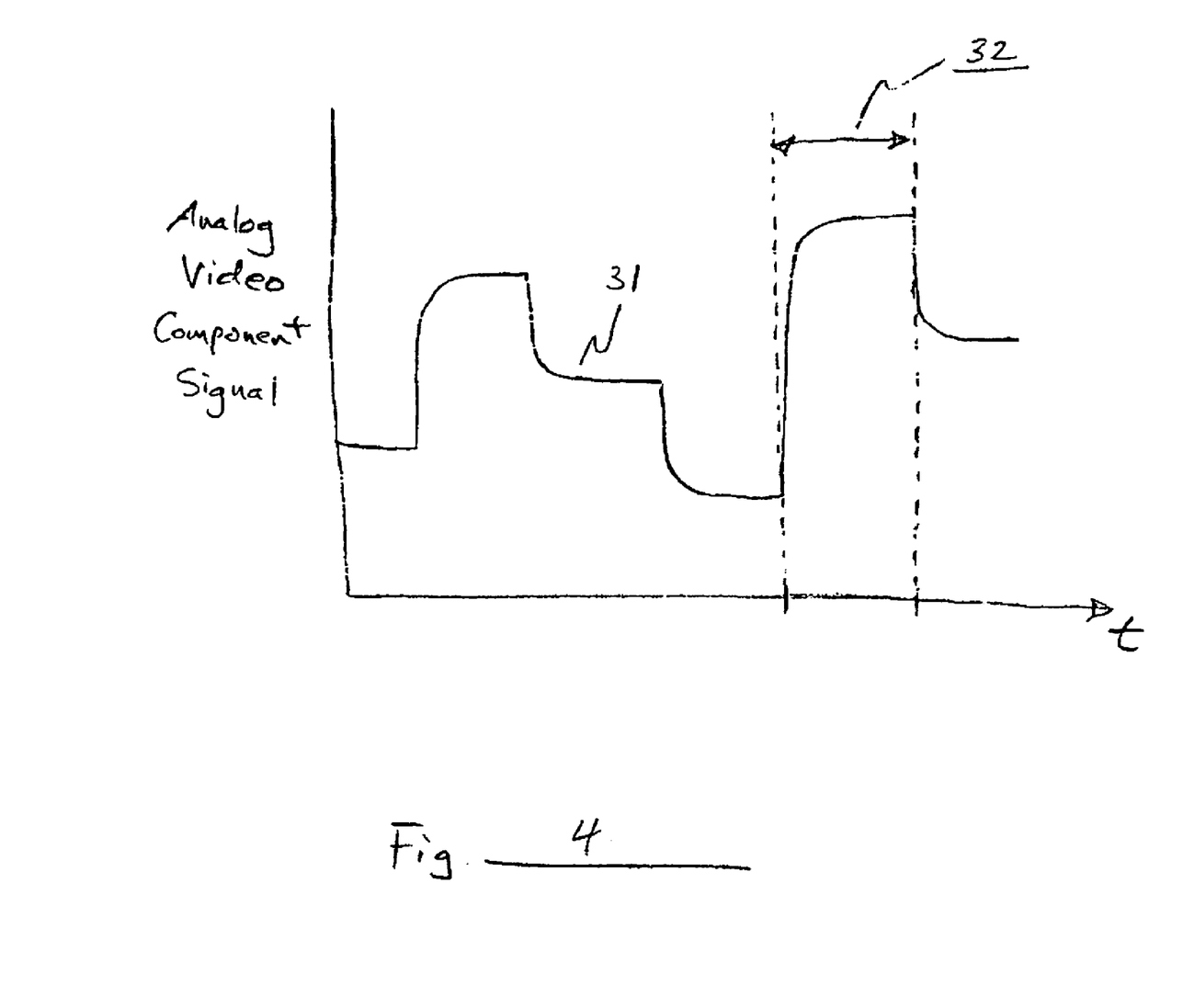
FIG. 4 is a timing diagram showing a typical analog video signal.

FIG. 4 illustrates a typical analog video signal color component 31 plotted over time. As discussed earlier, pixel time 32 is simply the time from the beginning of one pixel to the beginning of the next pixel.

Figure 3A:
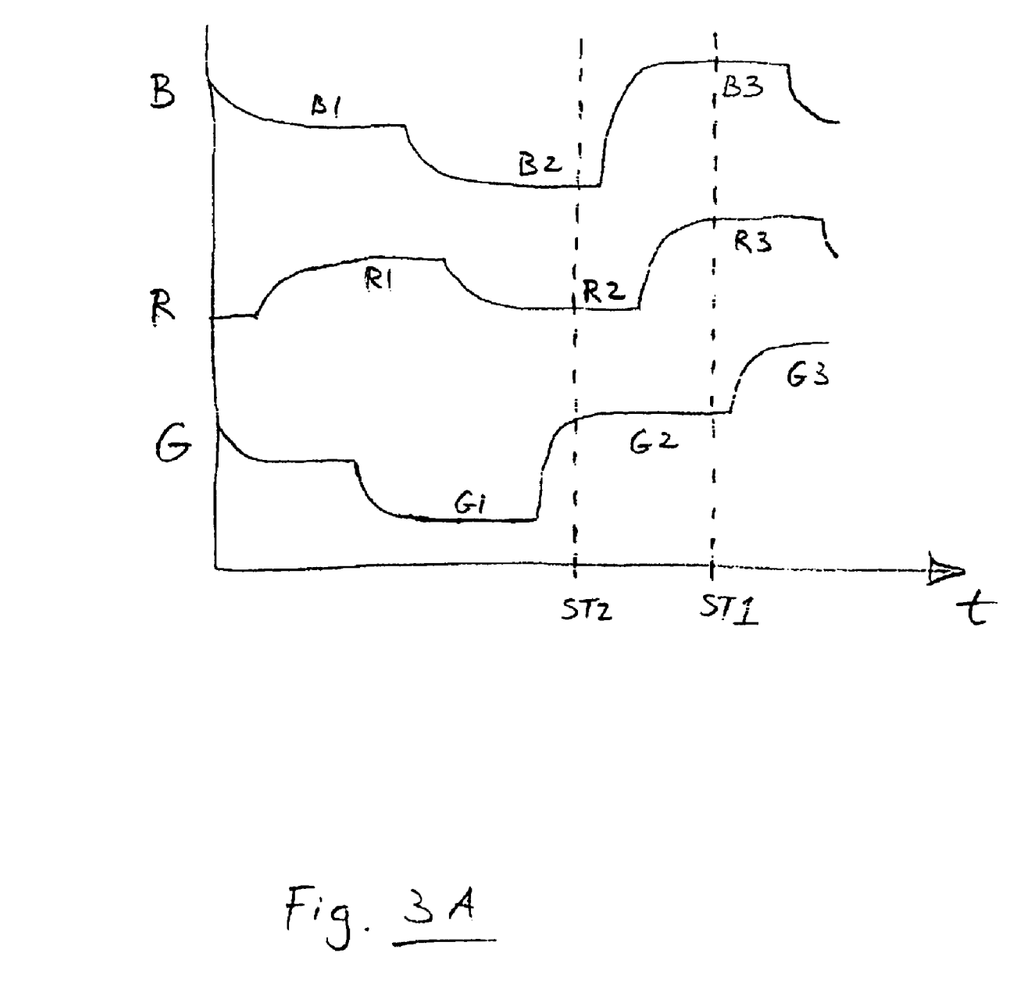
FIG. 3A is a timing diagram showing red, green and blue analog video signals and representative sample times.

FIG. 3A shows analog red, green, blue color signals that arrive at a digital flat panel display monitor in which the maximum amount of skew is less than one pixel time. The pixel data for the red, green and blue color components are shown as R1, R2 and R3 for red, B1, B2 and B3 for blue, and G1, G2 and G3 for green. When the pixel data was originally transmitted, pixel data R1, G1 and B1 were aligned with each other. However, after passing through a twisted pair cable, this pixel data is now skewed by less than one pixel time. Digital display monitors generally perform the A/D conversion process by sampling the received analog video signals at approximately the midpoint of a pixel time. In FIG. 3A, that sampling time is shown as ST1 which is aligned with the approximate midpoint of pixel B3.

If the analog-to-digital conversion process occurs at ST1, the A/D converter would sample B3 and R3. However, the converter would sample G2 instead of G3. When this information is then displayed on the digital monitor, the corresponding pixel viewed by the user would include pixel data B3, R3 and G2 instead of the correct pixel data B3, R3 and G3. As a result, the pixel skew associated with these video signals degrades the overall video image presented on the video monitor. Using either manual or automatic control over physical delay elements 23, 24 and 25, the arrival times of analog video signals RGB at video monitor 30 can be delayed by an equal amount so that the A/D conversion process is now based on samples taken at sample time ST2. A sample taken at ST2 would result in pixel data B2, R2 and G2. Thus, the individual pixels viewed by the user of the video monitor 30 corresponding to this sample would include pixel data B2, R2 and G2. The next sample would be taken exactly one pixel time later and would contain pixel data B3, R3 and G3. In this way, physical delay elements 23, 24 and 25 adequately compensate for pixel skew where the maximum skew is less than one pixel period.

The skew compensation approach shown in FIG. 3 does not work when the maximum pixel skew is greater than one pixel time. In those situations, the pixel data of the three color components never aligns so that the RGB video signals can be sampled at the same time to obtain the correct set of pixel data (for example, pixel data R1, G1 and B1). The present invention compensates for skew where the maximum skew is greater than one pixel time. Such large scale skew typically arises in applications where the twisted pair cable is much longer than a standard video cable connecting a personal computer to a video monitor. The longer the cable, the more skew that is induced on the video signals. Thus, there is a need for a solution to these larger scale skew problems.

Figure 5:
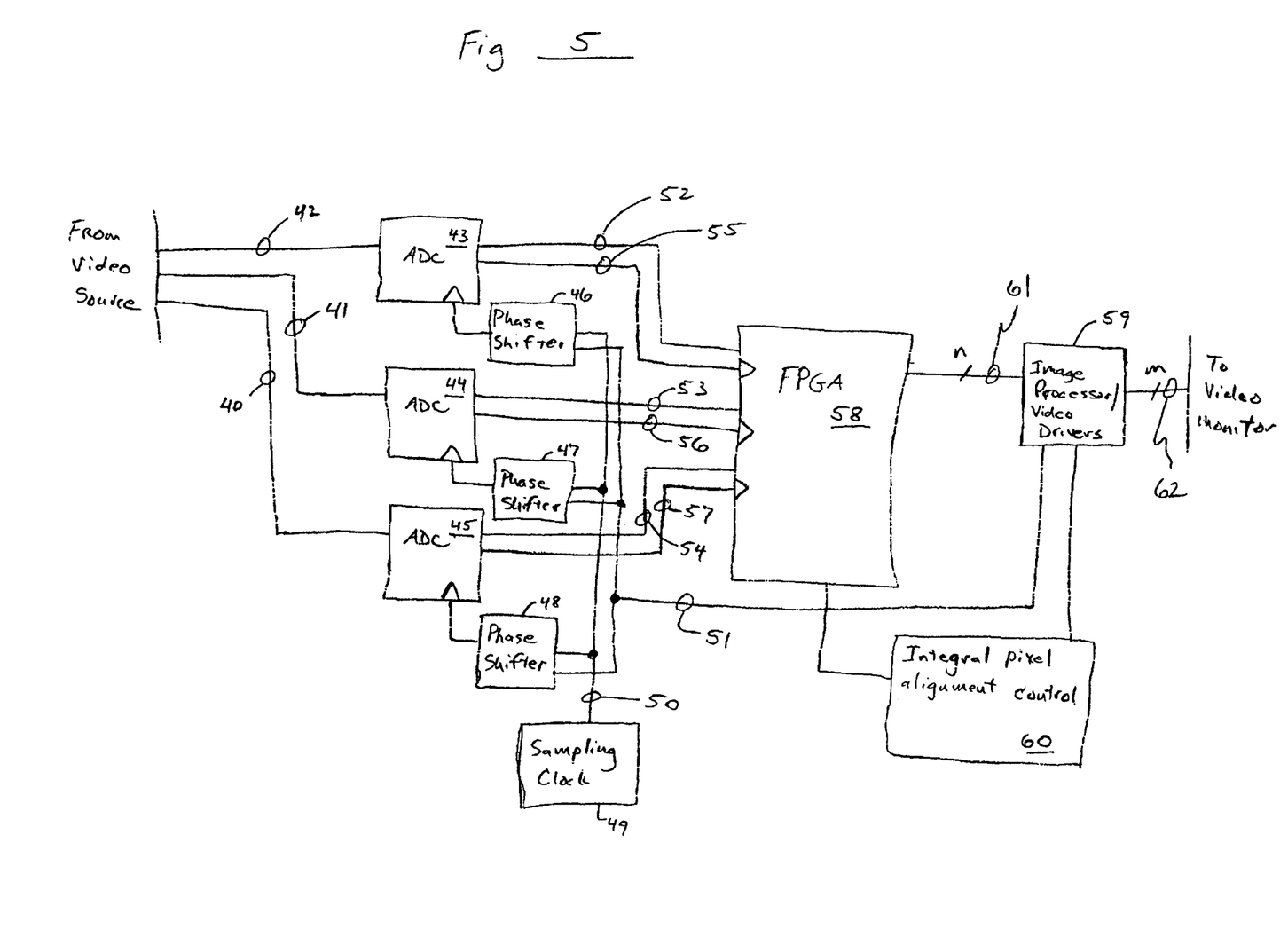
FIG. 5 is a block diagram showing a first example embodiment of the present invention.

FIG. 5 is a block diagram of one embodiment of the present invention in which large scale skew (i.e., skew greater than one pixel) is eliminated. In this embodiment, the analog red, green, blue color video signals correspond to signal lines 40, 41 and 42, respectively. The red, green, blue signal lines 40, 41 and 42 couple the analog pixel data into analog-to-digital converters (ADCs) 43, 44 and 45. ADCs 43, 44 and 45 sample the received analog video signals at different times in order to eliminate intrapixel skew. Sampling clock 49 generates a clock signal that is sent to phase shifters 46, 47 and 48. Phase shifters 46, 47 and 48 in turn adjust the phase of the clock signal from sampling clock 49 depending on the amount of skew associated with their respective color components received on lines 40, 41 and 42. The clocks output from phase shifters 46, 47 and 48 are used as the individual sampling clocks for ADCs 43, 44 and 45, respectively.

At the output of the ADCs, the video signals have now been digitized. These digitized video signals are then transmitted on lines 52, 53 and 54 to the second portion of the pixel skew compensation circuit. In the preferred embodiments, the second portion of the pixel skew compensation circuit implemented using a field programmable gate array (FPGA) device 58. FPGA 58 serves as a variable length FIFO (First-In First-Out) buffer for each of the three now-digitized color components. This component has adjustable depth settings for the buffers and allows for the two fastest signals to be aligned with the slowest signal. It should be understood that any device or collection of devices which can serve as a variable length FIFO for each sub-pixel channel can be substituted for the FPGA 58. Preferably, ADCs 43, 44 and 45 are of the type that output a clock or strobe signal that may be used to indicate when the data present at its output are stable and ready to be received as the next available set of digital information output by the ADC. In some preferred embodiments, ADCs 43, 44 and 45 are analog-to-digital converter Part No. AD9884A manufactured by Analog Devices of Norwood, Mass. However, it is contemplated that any suitable analog-to-digital converter circuit can be used to achieve the stated goals of the present invention. Once ADCs 43, 44 and 45 have digitized the analog video signals, the ADCs output the digital signals to FPGA 58 on lines 52, 53 and 54. Typically, signal lines 52, 53 and 54 will be a parallel bus comprised of several individual signal lines. ADCs 43, 44 and 45 strobe the digitized video signals on lines 52, 53 and 54 into the FPGA by sending a strobe signal on lines 55, 56 and 57, respectively. When the FPGA 58 receives the strobe signal on lines 55, 56 or 57, it reads the corresponding digitized information into a register or series of registers in FPGA 58.

Figure 6:
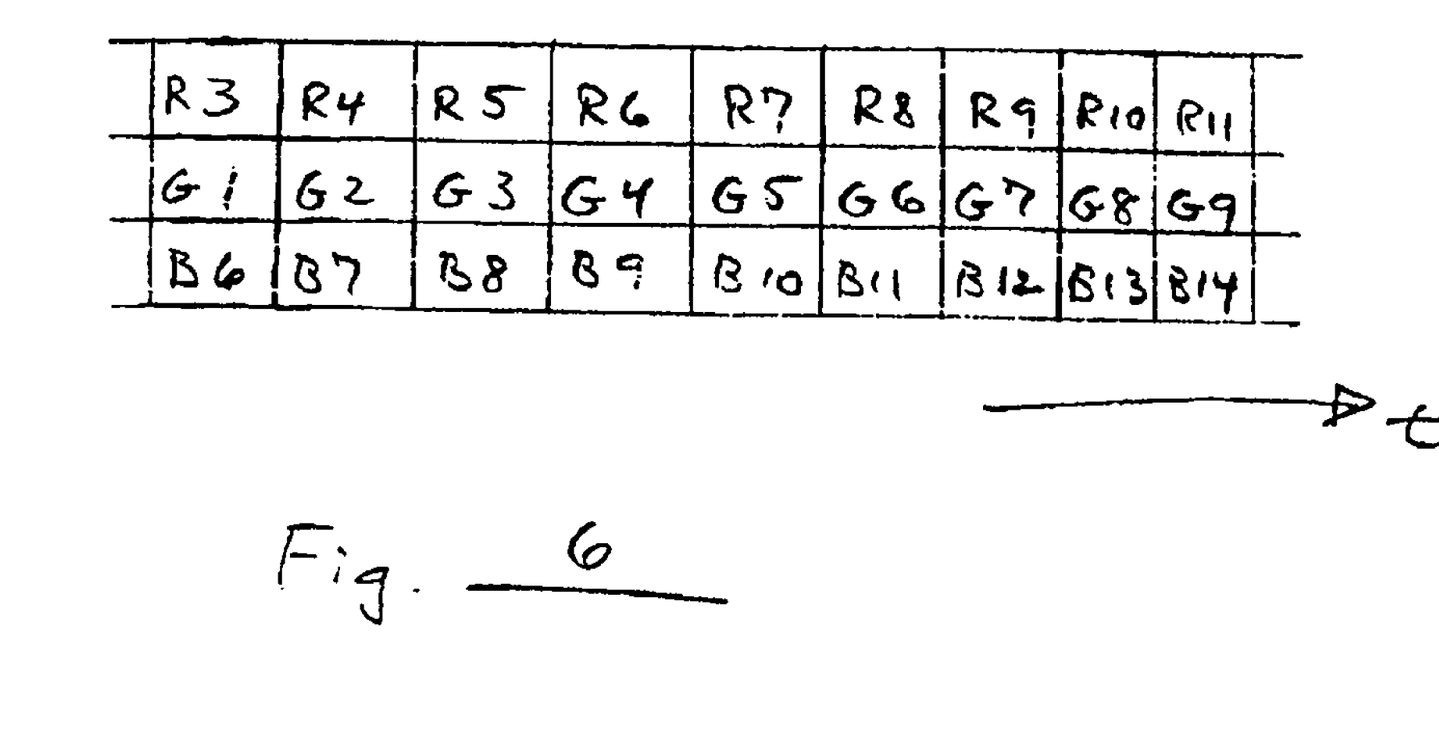
FIG. 6 is a timing diagram showing pixel alignment after a first stage of pixel de-skew according to an example embodiment of the present invention.

FIG. 6 describes how the digitized pixel data is output by ADCs 43, 44 and 45 as a function of time. The digitized pixel information is shown, for example, simply as R5, G4, B8, and the like. Each one of these blocks represents the plurality of individual bits that make up the digitized pixel data information output by an ADC. Because the clock used to sample the analog signals in ADCs 43, 44 and 45 has been individually shifted in phase for each sub-pixel channel, the digitized pixel data resident within the FPGA 58 is effectively synchronized from color component to color component. That is, the intrapixel skew has been eliminated. For example, using the representative data shown in FIG. 6, digitized pixel data R3, G1 and B6 are respectively stored in the first set of registers in FPGA 58. After the next series of strobes from ADCs 43, 44 and 45, digitized pixel data R4, G2 and B7 are strobed into the first set of registers in FPGA 58, while digitized pixel data R3, G1 and B6 are effectively shifted to the next set of registers in FPGA 58. This process continues within FPGA 58 until integral pixel alignment control 60 commands FPGA 58 to output digitized pixel data on line 61. Signal line 61 is in reality n individual signal lines. Image processor/video drivers 59 receive the video signals after they have been de-skewed by FPGA 58. Image processor/video drivers 59 then outputs the digital video information on signal lines 62 having m individual signal lines.

Figure 7:
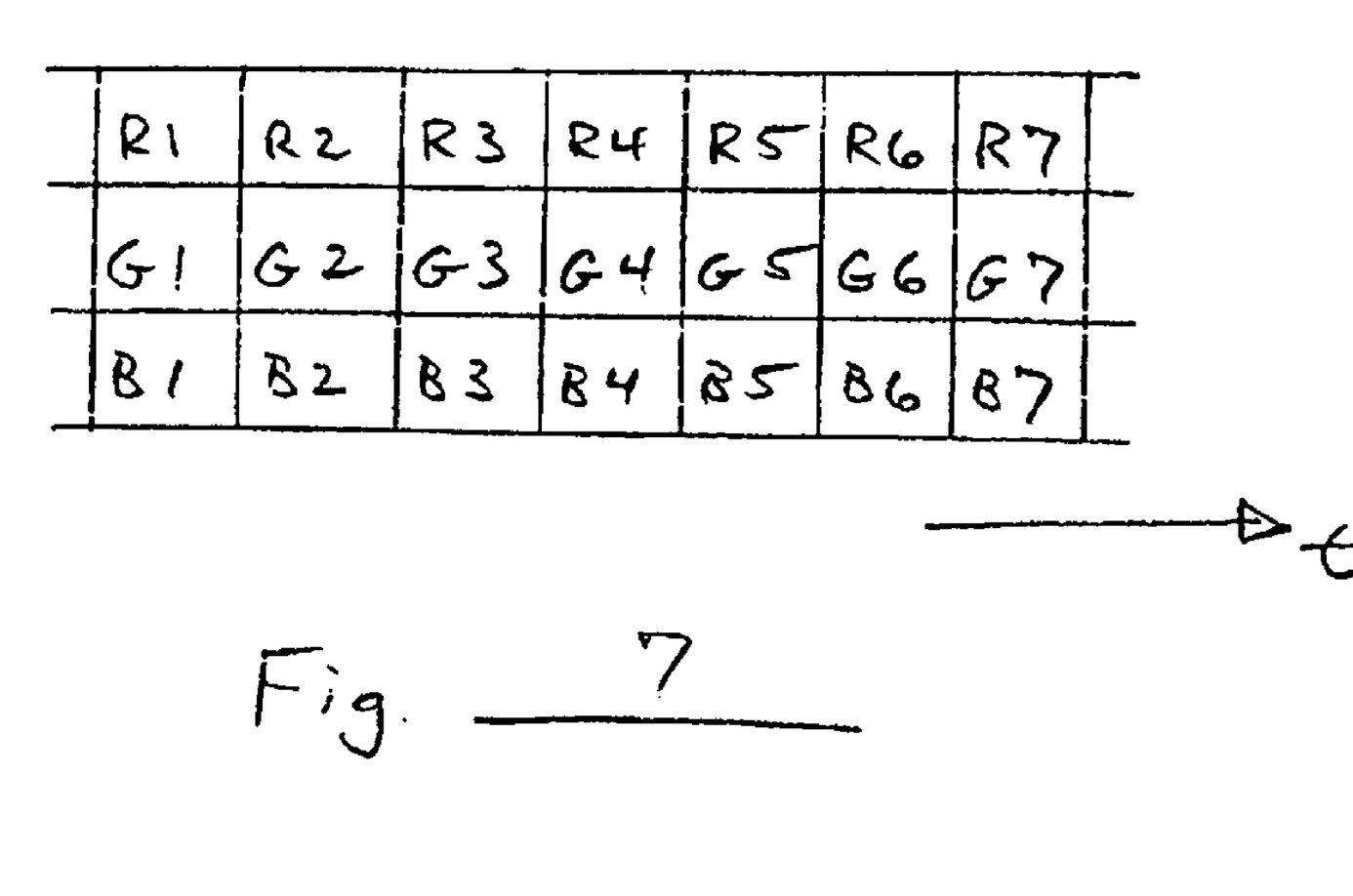
FIG. 7 is a timing diagram showing alignment of pixel data after a second step of pixel de-skew according to an example embodiment of the present invention.

FIG. 7 shows the pixel data for each sub-pixel channel after the interpixel skew has been eliminated from the pixel data shown in FIG. 6. In FIG. 7, the previously misaligned pixel data has been time-shifted so that the red, green and blue pixel data for pixel one (i.e., R1, G1 and B1) is aligned together. The same is true for each of the other pixels.

In the block diagram of FIG. 5, image processor/video drivers 59 is a representative block for the combination of an image processor circuitry and the video drivers required to drive a digital video monitor coupled to line 62. The video drivers could be separated from the image processor if desired. However, in the preferred embodiment, it is contemplated that the image processor will also contain circuitry for driving the video monitor itself. A presently preferred image processor/video driver 59 is an image processor PW164A digital display controller integrated circuit manufactured by Pixel Works, of Tualatin, Oreg.

Image processor 59 monitors the digitized video information arriving on signal lines 61 and, in a closed loop fashion, controls the amount of phase shift induced on the clock signal 50 by phase shifters 46, 47 and 48. Control over the phase shifters 46, 47 and 48 is exercised via control line 51, which may be implemented as separate control lines for each phase shifter. Control over phase shifters 46, 47 and 48 allows image processor 59 to individually control the amount of phase shift induced by each of the phase shifters 46, 47 and 48. In this way, image processor 59 individually controls the phase of the sampling clock passing through phase shifters 46, 47 and 48, thereby individually controlling the time at which ADCs 43, 44 and 45 sample the analog red, green and blue color signals 40, 41 and 42.

Image processor 59 also works in conjunction with integral pixel alignment control 60 to correct the interpixel skew using FPGA 58. Again, image processor 59 monitors the digitized video signals received on lines 61. In some embodiments, integral pixel alignment control 60 may be a separate from the image processor 59. However, in the presently preferred Pixel Works device mentioned above, the software runs in the CPU, which is part of the image processor and not separate. The control for this realignment in the FPGA uses the automatic adjustment features found in most new digital display monitors. For example, an adjustment which centers the image on the screen can, if applied to the individual sub-pixel channels inherent in FPGA 58, also realign these sub-pixels at the integral-pixel level, such that each one is centered on the screen, and therefore aligned with each other.

Circuits other than an FPGA may be used to accomplish this interpixel alignment. For example, where screen alignment might be done with a single overall memory address, enhanced control software can set up variable length buffers which can be used to compensate for interpixel skew. The sub-pixel channel having the greatest delay (as determined by present alignment features) would be set up with the minimum buffer length. The next slowest sub-pixel channel would have a somewhat longer buffer length. Finally, the sub-pixel channel with the shortest propagation time would have the longest buffer length.

Figure 8:
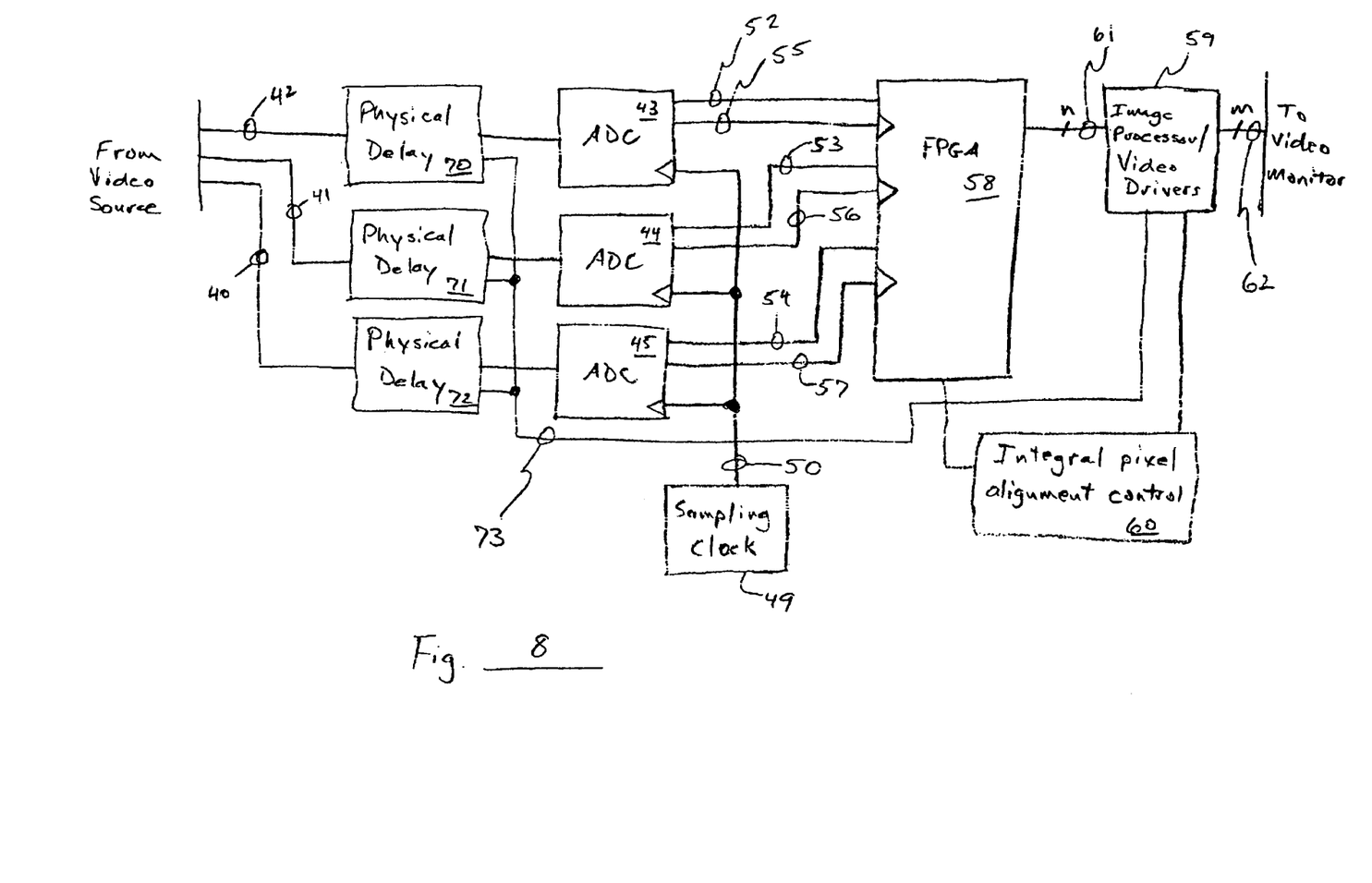
FIG. 8 is a block diagram of a second example embodiment of the present invention.

FIG. 8 describes a second embodiment of the present invention. In this embodiment, the analog red, green and blue video signals 40, 41 and 42 first pass through physical delay elements 70, 71 and 72. These physical delay elements are variable and are under the control of image processor 59 through control line 73. Control line 73 may be implemented as three separate control lines so that image processor 59 can independently control the amount of physical delay imposed on the analog red, green and blue video signals by physical delay elements 70, 71 and 72. By using a variable amount of physical delay, the analog output of physical delay elements 70, 71 and 72 can be time shifted so that the intrapixel skew is eliminated. Because the intrapixel skew is eliminated in the analog video signals, there is no need for the ADCs 43, 44 and 45 to sample those analog signals at different times. As a result, the clock signal output by sampling clock 49 can be used to directly drive ADCs 43, 44 and 45 without any phase shift added to the clock signal. The second phase of de-skew is implemented as described above with respect to the embodiment shown in FIG. 5. Namely, the interpixel skew is eliminated or compensated for by three variable length FIFO buffers which are preferably implemented as FPGA 58.

Even though physical delay elements are used in the embodiment shown in FIG. 8, these delay elements can be substantially smaller than the delay elements conventionally used to eliminate all of the pixel skew associated with transmission of video signals through twisted pair cables. Physical delay elements 70, 71 and 72 need only be large enough to eliminate a maximum of one pixel time of skew from the analog video signals. Conventionally, where physical delay elements alone are used to eliminate pixel skew, the physical delay elements must be capable of eliminating up to several pixels of skew themselves. These requires much larger physical delay elements than are necessary in the embodiment shown in FIG. 8.

Figure 9:
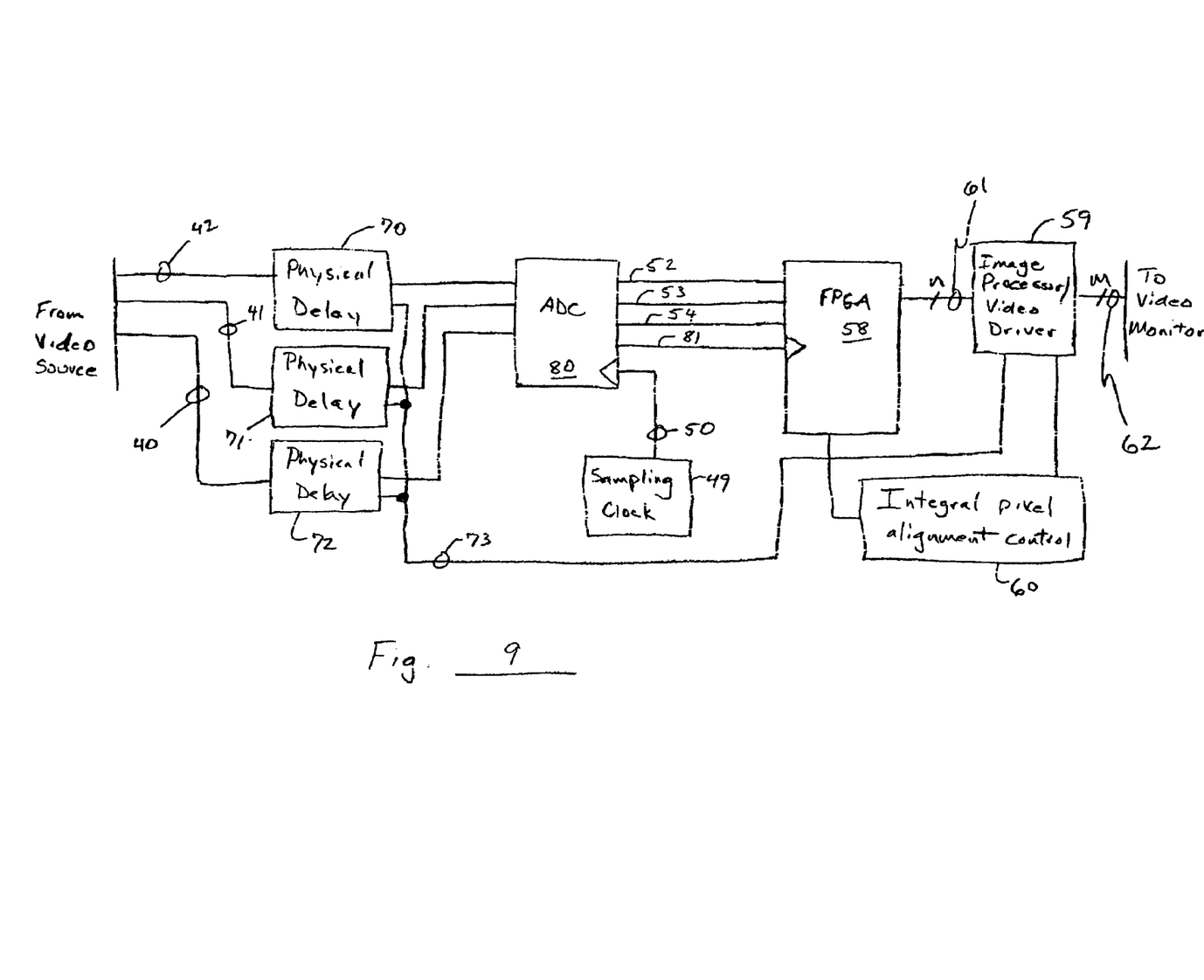
FIG. 9 is a block diagram of a third example embodiment of the present invention.

FIG. 9 shows another embodiment of the present invention. This embodiment is similar to the embodiment shown in FIG. 8 except that instead of using three separate ADC devices to convert analog video signals, a single ADC device 80 is used which is capable of simultaneously converting three separate analog signals to digital format. The digitized red, green and blue video signals are output on signal lines 52, 53 and 54. As with the embodiments shown in FIGS. 5 and 8, these digitized video signals do not have intrapixel skew, however, they may still contain interpixel skew. The digitized red, green and blue video signals on lines 52, 53 and 54 are strobed into FPGA 58 by a strobe signal on line 81. Interpixel skew is then eliminated, as described above, in FPGA 58 serving as three variable length FIFOs.

Figure 10:
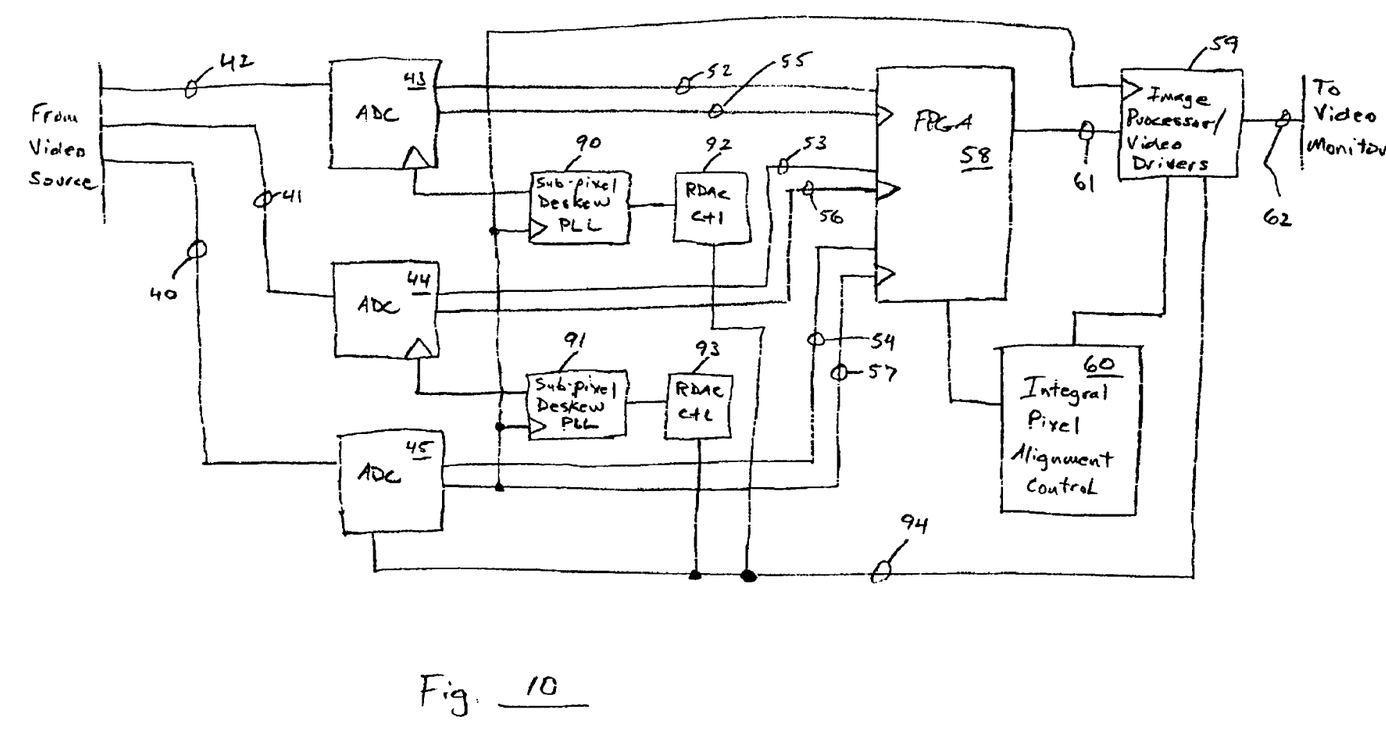
FIG. 10 is a block diagram of a fourth example embodiment of the present invention.

FIG. 10 discloses yet another embodiment of the present invention. In this embodiment, the analog red, green and blue video signals 40, 41, 42 are received by ADCs 43, 44 and 45. ADC 45 is an analog-to-digital converter of the type that contains an internal clock generator which generates and outputs a clock signal using horizontal sync signals extracted from one of the incoming analog video signals. In the embodiment shown in FIG. 10, ADC 45 outputs its clock signal on line 57 which is used to strobe data into FPGA 58. Clock signal 57 is also tied to a clock input of a sub-pixel de-skew phase lock loop (PLL) 91. Sub-pixel de-skew PLL 91 is operated under the control of RDAC control 93, (an RDAC is a digital-to-analog converter whose output appears as a variable resistor). By varying the resistance of the RDAC, e.g., through software control), the amount of skew can be changed. RDAC control 93, in turn, is controlled by image processor 59 through signal lines 94. ADC 45 is also controlled by image processor 59 through signal lines 94. The clock signal generated by ADC 45 passes through sub-pixel de-skew PLL 91 which alters the phase of the clock signal before transmitting that clock signal to ADC 44. Sub-pixel de-skew PLL 91 shifts the phase of the clock signal in order to compensate for the skew associated with the green signal line 41 relative to the red signal on line 40. The clock signal output by ADC 45 is also tied to sub-pixel de-skew PLL 90 which is under the control of RDAC control 92. Sub-pixel de-skew PLL 90 alters the phase of the incoming clock signal from ADC 45 to compensate for the skew associated with the blue analog video signal arriving on signal line 42 relative to the red signal on line 40. The clock signal output by sub-pixel de-skew PLL 90 is used to clock ADC 43. RDAC control 92 is controlled by image processor 59 through control lines 94.

The embodiment shown in FIG. 10 eliminates the need for a sampling clock signal generator and instead uses the clock generator within ADC 45. The amount of phase shift applied by sub-pixel de-skew PLL 90 and 91 is derived from the control signals 94. ADCs 43, 44 and 45 remove the intrapixel skew from the received analog video signals. The digitized analog video signals are then transmitted to the three variable length FIFOs, which preferably are implemented as a single FPGA device 58. In this preferred embodiment, the FPGA 58 then removes the interpixel skew as discussed previously.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

We claim:

1. A video receiver comprising:
   inputs to receive video color components skewed relative to each other; and
   skew compensation circuitry coupled to the inputs to de-skew the video color components for both intrapixel skew and interpixel skew, wherein:
   the intrapixel skew is a separation between the beginning of a pixel time for one video color component and the beginning of a pixel time for a second video color component where the two pixel times at least partially overlap each other, and the interpixel skew is a separation between the beginning of a pixel time for one video color component and the beginning of a pixel time for a second video color component where the two pixel times do not overlap each other.

2. A video receiver according to claim 1 wherein the skew compensation circuitry includes a first compensation circuit that compensates for intrapixel skew associated with the video color components.

3. A video receiver according to claim 2 wherein the skew compensation circuitry includes a second compensation circuit to compensate for interpixel skew associated with the video color components.

4. A video receiver according to claim 3 wherein the first compensation circuit is coupled to the second compensation circuit.

5. A video receiver according to claim 1, wherein the video color components are analog video signals.

6. A video receiver according to claim 1, wherein the skew compensation circuitry comprises an analog-to-digital converter.

7. A video receiver according to claim 6, wherein the skew compensation circuitry further comprises a physical delay element.

8. A video receiver according to claim 6, wherein the skew compensation circuitry further comprises a plurality of physical delay elements.

9. A video receiver according to claim 1, wherein the skew compensation circuitry comprises a plurality of analog-to-digital converters.

10. A video receiver according to claim 9, wherein the skew compensation circuitry further comprises a physical delay element.

11. A video receiver according to claim 9, wherein the skew compensation circuitry further comprises a plurality of physical delay elements.

12. A video receiver according to claim 1, wherein the skew compensation circuitry comprises a variable length FIFO.

13. A video receiver according to claim 1, wherein the skew compensation circuitry comprises a field programmable gate array circuit.

14. A video receiver according to claim 1, wherein the skew compensation circuitry includes a first compensation circuit that samples a first video color component according to a first clock signal;
   wherein the first compensation circuit samples a second video color component according to a second clock signal; and
   wherein the second clock signal has a phase different from the phase of the first clock signal.

15. A video receiver according to claim 14, wherein the first compensation circuit samples a third video color component according to a third clock signal; and
   wherein the third clock signal has a phase different from the phase of the first clock signal and the phase of the second clock signal.

16. A video receiver according to claim 15, wherein the phase of the third clock signal is related to the magnitude of the skew associated with the third video color component.

17. A video receiver according to claim 14, wherein the phase of the first clock signal is related to the magnitude of the skew associated with the first video color component.

18. A video receiver according to claim 17, wherein the phase of the second clock signal is related to the magnitude of the skew associated with the second video color component.

19. A video receiver according to claim 1, wherein the skew compensation circuitry includes a second skew compensation circuit that generates digitized video signals that are coupled to a video display.

20. A video receiver according to claim 19, wherein the video display is a digital video monitor.

21. A video receiver according to claim 1, wherein the video color components include red, green and blue video color components.

22. A method of compensating for pixel skew comprising the steps of:
   receiving a first set of video signals comprised of color components;
   generating a second set of video signals comprised of color components, wherein the second set of video signals are related to the first set of video signals, and wherein pixel data of a first color component of the second set of video signals are synchronous with pixel data of a second color component of the second set of video signals; and generating a third set of video signals comprised of color components, wherein the third set of video signals are related to the second set of video signals, and wherein a temporal relationship between pixel data of the color components of the third set of video signals is different from a temporal relationship between pixel data of the color components of the second set of video signals.

23. A method of compensating for pixel skew according to claim 22, further comprising the step of digitizing the first set of video signals.

24. A method of compensating for pixel skew according to claim 22, wherein the pixel data of the second set of video signals are digitized representations of pixel data of the first set of video signals.

25. A method of compensating for pixel skew according to claim 22, further comprising the step of compensating for intrapixel skew associated with a first color component of the first set of video signals, wherein the intrapixel skew is a separation between the beginning of a pixel time for one color component and the beginning of a pixel time for a second color component, where the two pixel times at least partially overlap each other.

26. A method of compensating for pixel skew according to claim 25, further comprising the step of compensating for interpixel skew associated with the first color component of the first set of video signals, wherein the interpixel skew is a separation between the beginning of a pixel time for one color component and the beginning of a pixel time for a second color component, where the two pixel times do not overlap each other.

27. A method of compensating for pixel skew comprising the steps of:
  receiving red, green and blue video signals on separate twisted pairs;
  digitizing the red, green and blue video signals;
  compensating for intrapixel skew associated with the red, green and blue video signals, wherein the intrapixel skew is a separation between the beginning of a pixel time for one video color component and the beginning of a pixel time for a second video color component, where the two pixel times at least partially overlap each other;
  compensating for interpixel skew associated with the red, green and blue video signals, wherein the interpixel skew is a separation between the beginning of a pixel time for one video color component and the beginning of a pixel time for a second video color component, where the two pixel times do not overlap each other; and
  thereafter, combining the compensated red, green and blue video signals into a pixel signal.

28. The method according to claim 27 wherein the steps of interpixel skew compensation occurs after the step of intrapixel skew compensation.

29. A pixel skew compensation circuit comprising:
  video inputs which receive video color components skewed relative to each other;
  a plurality of analog-to-digital converters, wherein each of the analog-to-digital converters is coupled to a single video input, and wherein each of the analog-to-digital converters digitize their associated video color component thereby generating a set of digitized color components;
  a plurality of phase shifters, each coupled to a single analog-to-digital converter, wherein the phase shifters output a clock signal to their associated analog-to-digital converter;
  an FPGA coupled to outputs of the plural analog-to-digital converters, wherein the FPGA receives the set of digitized color signals and outputs a second set of digitized color signals related to the set of digitized color signals to an image processor;
  the image processor is coupled to a digital video monitor and provides control information to the FPGA.

30. A pixel skew compensation circuit according to claim 29 wherein the FPGA serves as a variable length FIFO.

31. A pixel skew compensation circuit according to claim 29 wherein one of the analog-to-digital converters outputs a signal to indicate when the FPGA is to input a digitized color component from the analog-to-digital converter.

* * * * *